(12) United States Patent
Fujihara et al.

(10) Patent No.: US 8,556,018 B2
(45) Date of Patent: Oct. 15, 2013

(54) DRIVE ASSEMBLY FOR AN ELECTRIC MOTORCYCLE, AND ELECTRIC MOTORCYCLE INCORPORATING SAME

(75) Inventors: Kiyotaka Fujihara, Saitama (JP); Takashi Suzuki, Saitama (JP); Kaoru Machino, Saitama (JP); Sho Kono, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 13/282,690

(22) Filed: Oct. 27, 2011

(65) Prior Publication Data

US 2012/0103716 A1  May 3, 2012

(30) Foreign Application Priority Data

Oct. 29, 2010  (JP) ................................. 2010-243975

(51) Int. Cl.
*B62D 61/02* (2006.01)

(52) U.S. Cl.
USPC ........................................................ 180/220

(58) Field of Classification Search
USPC ....................... 180/220, 65.1, 65.7, 68.5, 221
See application file for complete search history.

(56) References Cited

U.S. PATENT DOCUMENTS

| | | | |
|---|---|---|---|
| 4,864,959 A * | 9/1989 | Takamizawa et al. | 114/315 |
| 5,657,830 A * | 8/1997 | Kawashima et al. | 180/220 |
| 2012/0111651 A1* | 5/2012 | Irie et al. | 180/65.1 |
| 2012/0193155 A1* | 8/2012 | Hasegawa et al. | 180/65.1 |
| 2012/0234615 A1* | 9/2012 | Takamura et al. | 180/68.5 |
| 2013/0015633 A1* | 1/2013 | Nakabayashi et al. | 280/281.1 |

FOREIGN PATENT DOCUMENTS

JP   05-105176 A   4/1993

* cited by examiner

*Primary Examiner* — Tashiana Adams
(74) *Attorney, Agent, or Firm* — Carrier Blackman & Associates, P.C.; William D. Blackman; Joseph P. Carrier (57) ABSTRACT

An electric motorcycle includes an electric motor for generating a traveling driving force, a battery for supplying electricity to the electric motor, and a case member for accommodating the electric motor and the battery therein. The battery includes a plurality of battery modules, which are disposed in the case member at positions forward of and above of the electric motor. Such arrangement of the electric motor and the battery in the case member helps to centralize mass in a vehicle body of the motorcycle, as well as simplifying assembly of the motorcycle.

15 Claims, 6 Drawing Sheets

DRIVE ASSEMBLY FOR AN ELECTRIC MOTORCYCLE, AND ELECTRIC MOTORCYCLE INCORPORATING SAME

CROSS-REFERENCE TO RELATED APPLICATIONS

The present invention claims priority under 35 USC 119 based on Japanese patent application No. 2010-243975, filed on Oct. 29, 2010. The entire subject matter of this priority document, including specification claims and drawings thereof, is incorporated by reference herein.

BACKGROUND OF THE INVENTION

1. Field of the Invention

The present invention relates to an electric motorcycle. More particularly, the present invention relates to a drive assembly, including an electric motor and battery for an electric motorcycle, and to an electric motorcycle incorporating the drive assembly.

2. Description of the Background Art

There is a known electric motorcycle in which an electric motor, for generating a traveling driving force, is disposed substantially in a center position of a body frame of the motorcycle, and in which a battery, for feeding power to the electric motor, is arranged in front of the electric motor on a front portion of the body frame, and the battery includes multiple battery modules arranged one above the other. An example of such a known electric motorcycle is disclosed in Japanese Unexamined Patent Publication No. H5-105176.

However, in the electric motorcycle of Japanese Publication H5-105176 an electric motor and a battery, which are relatively heavy in weight, are separately disposed as described above, and this design has a problem in that the heavy portions in the vehicle body are dispersed on the frame, and the installation work is complicated.

The present invention has been made to overcome the drawbacks of existing arrangements of an electric motor and a battery for an electric motorcycle. Accordingly, it is an object of the present invention to provide an electric motorcycle which centralizes mass in the vehicle body.

It is another object of the present invention to simplify the installation of an electric motor and battery on the frame during assembly of an electric motorcycle.

SUMMARY OF THE INVENTION

In order to achieve the above objects, the present invention according to a first aspect thereof provides an electric motorcycle including an electric motor for generating a traveling driving force (for example, an electric motor 70 in the embodiment); a battery for supplying electric power to the electric motor (for example, a battery 91 in the embodiment), wherein the battery is disposed at a position located forward and upward of the electric motor; and a drive assembly (for example, a drive assembly 50 in the embodiment) including a case member (for example, a case member 51 in the embodiment) for accommodating the electric motor and the battery therein.

The present invention according to a second aspect thereof, in addition to the first aspect, is characterized in that the drive assembly is provided with a motor driver (for example, a motor driver 107 in the embodiment) arranged below the electric motor and the battery; and the motor driver is mounted on a lower surface of the case member.

The present invention according to a third aspect thereof, in addition to the second aspect, is characterized in that the motorcycle further includes a body frame (for example, a body frame 11 in the embodiment) having a protective frame (for example, a lower frame portion 25 in the embodiment) extending longitudinally on a lower side of the motor driver.

The present invention according to a fourth aspect thereof, in addition to one of second and third aspects, is characterized in that the motorcycle further includes first fins (for example, fins 101 in the embodiment) formed on a front surface of the case member, and wherein the fins extend vertically.

The present invention according to a fifth aspect thereof, in addition to one of second through fourth aspects, is characterized in that the motorcycle further includes second fins (for example, fins 111 in the embodiment) formed on a lower surface of the motor driver, and wherein the fins extend longitudinally.

The present invention according to a sixth aspect thereof, in addition to one of the first through fifth aspects, is characterized in that case member has intake ports (for example, intake ports 99 in the embodiment) for taking air in formed at upper portion on a front side of the case member, and an exhaust port (for example, an exhaust port 104 in the embodiment) for discharging air formed at a lower portion of a rear side of the case member.

The present invention according to a seventh aspect of the present invention, in addition to one of the first through sixth aspects, is characterized in that a body frame includes a dividing portion (for example, an intermittent portion 65 in the embodiment), and wherein the case member is made of aluminum alloy and is attached to the dividing portion of the body frame.

EFFECTS OF THE INVENTION

According to the first aspect of the present invention, since the battery is disposed at a position located forward and upward of the electric motor, it is possible to put together and compactly dispose the relatively heavy electric motor and battery, which enables to centralize the mass in the vehicle body. In addition, the drive assembly is composed for accommodating the electric motor and the battery in the case member, which thereby can improve the installation work and protect the electric motor and the battery effectively.

According to the second aspect of the present invention, since the drive assembly is provided with the motor driver arranged below the electric motor and the battery, it is possible to further centralize the mass in the vehicle body and to further improve the installation work. Additionally, the motor driver is mounted on the lower surface of the case member, which thereby enables to remove and install the motor driver readily and easily facilitate the maintenance of the motor driver.

According to the third aspect of the present invention, due to the fact that the protective frame of the body frame longitudinally extends on the lower side of the motor driver, it is possible to protect the motor driver from hitting the ground.

According to the fourth aspect of the present invention, due to the fact that the front surface of the case member is formed with the first fins extending vertically, it is possible to flow the driving wind colliding with the front surface of the case member toward the motor driver mounted on the lower surface of the case member, which thereby enables to cool the motor driver efficiently.

According to the fifth aspect of the present invention, due to the fact that the lower surface of the motor driver is formed with the second fins extending longitudinally, it is possible to flow the driving wind from the front to the rear of the motor driver, which thereby enables to cool the motor driver efficiently.

According to the sixth aspect of the present invention, during operation, air is taken in from the intake ports which are formed to the upper portion on front side of the case member, is flown rearward and downward within the case member and is discharged from the exhaust port which is formed to the lower portion on rear side of the case member. Thus, it is possible to cool the electric motor and the battery in the case member efficiently.

According to seventh aspect of the present invention, since the case member is made of aluminum alloy and is attached to the intermittent portion of the body frame, the case member also serves as a part of the body frame, which thereby enables to reduce the vehicle body in weight.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, an electric motorcycle M according to the illustrative embodiment of the present invention will now be described with reference to drawings FIGS. 1-7.

Figure 1:
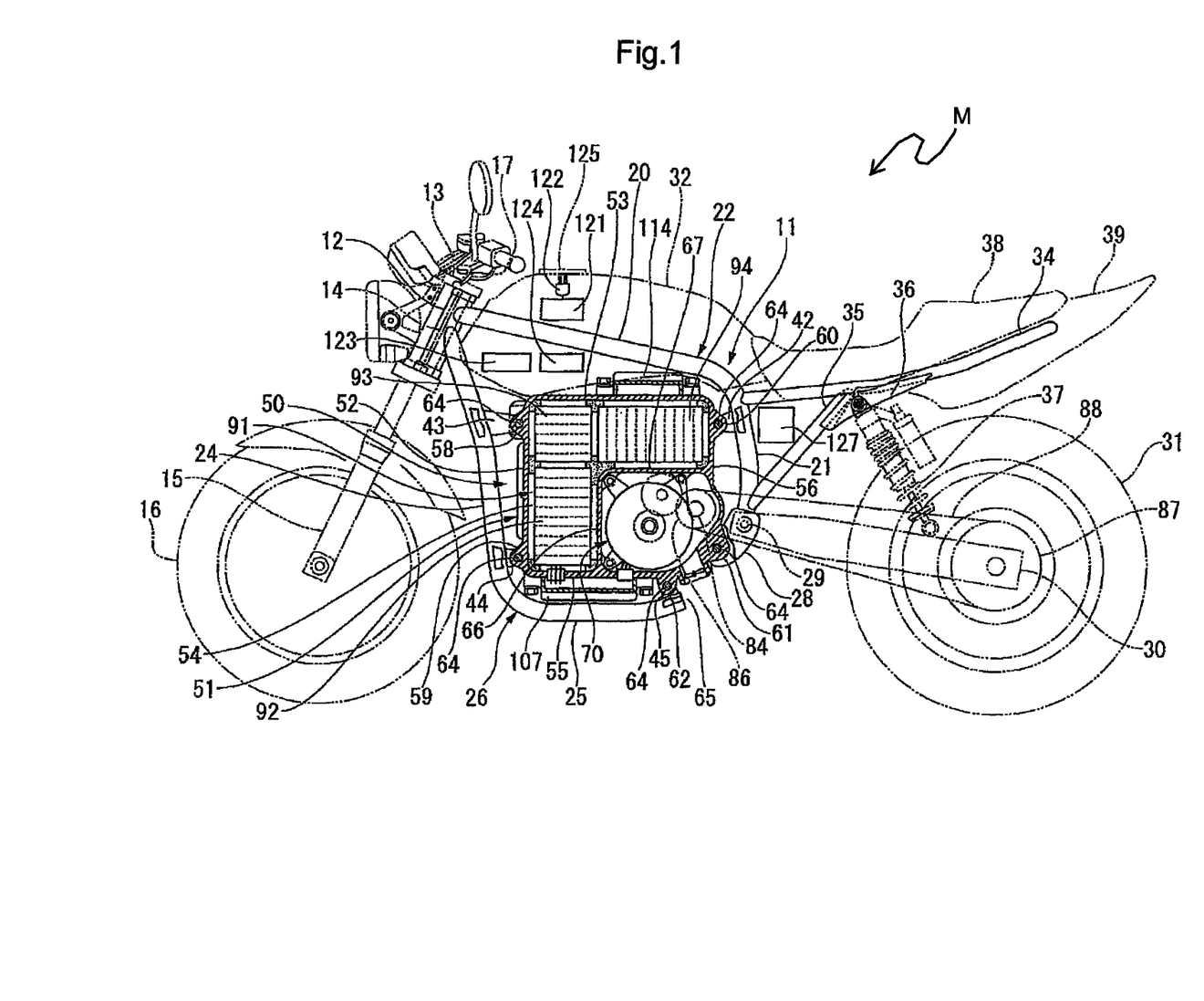
FIG. 1 is a side view of an electric motorcycle according to an illustrative embodiment of the present invention.

As shown in FIG. 1, the electric motorcycle M according to the present invention includes a steering shaft 14 provided on a stem 13. The steering shaft is rotatably and pivotally supported in a head pipe 12 provided on the front end of a body frame 11. A pair of left and right front forks 15 is attached to the stem 13. A front wheel 16 is pivotally supported at a lower end of the front forks 15, and a handle 17 is mounted on the upper portion of stem 13. The front wheel 16 can be steered using the handle 17.

Additionally, the body frame 11 includes a main frame 22. The main frame 22 includes an upper frame portion 20 extending rearwardly from the head pipe 12 and a back frame portion 21 extending downwardly from the rear end of the upper frame portion 20 and disposed centrally in a left and right direction. A pivot bracket 28 is affixed to the lower end of the back frame portion 21 of the main frame 22, as shown.

The body frame 11 also includes a down tube 26 with a front frame portion 24 extending downwardly from a portion of the head pipe 12 below a point of attachment of the main frame 22, and a lower frame portion 25 (protective frame) extending rearwardly from the lower end of the front frame portion 24 and disposed centrally in the left and right direction.

Further, a pivot shaft 29 is pivotally supported on the pivot bracket 28, and the front end of a swing arm 30 is pivotally supported by the pivot shaft 29. A rear wheel 31 is rotatably attached to the rear end of the swing arm 30, and is pivotally swingable with movement of the swing arm. Accordingly, the rear wheel 31 can be vertically movable. A tank-type cover 32 is provided over the main frame 22 so as to cover the upper frame portion 20.

Figure 2:
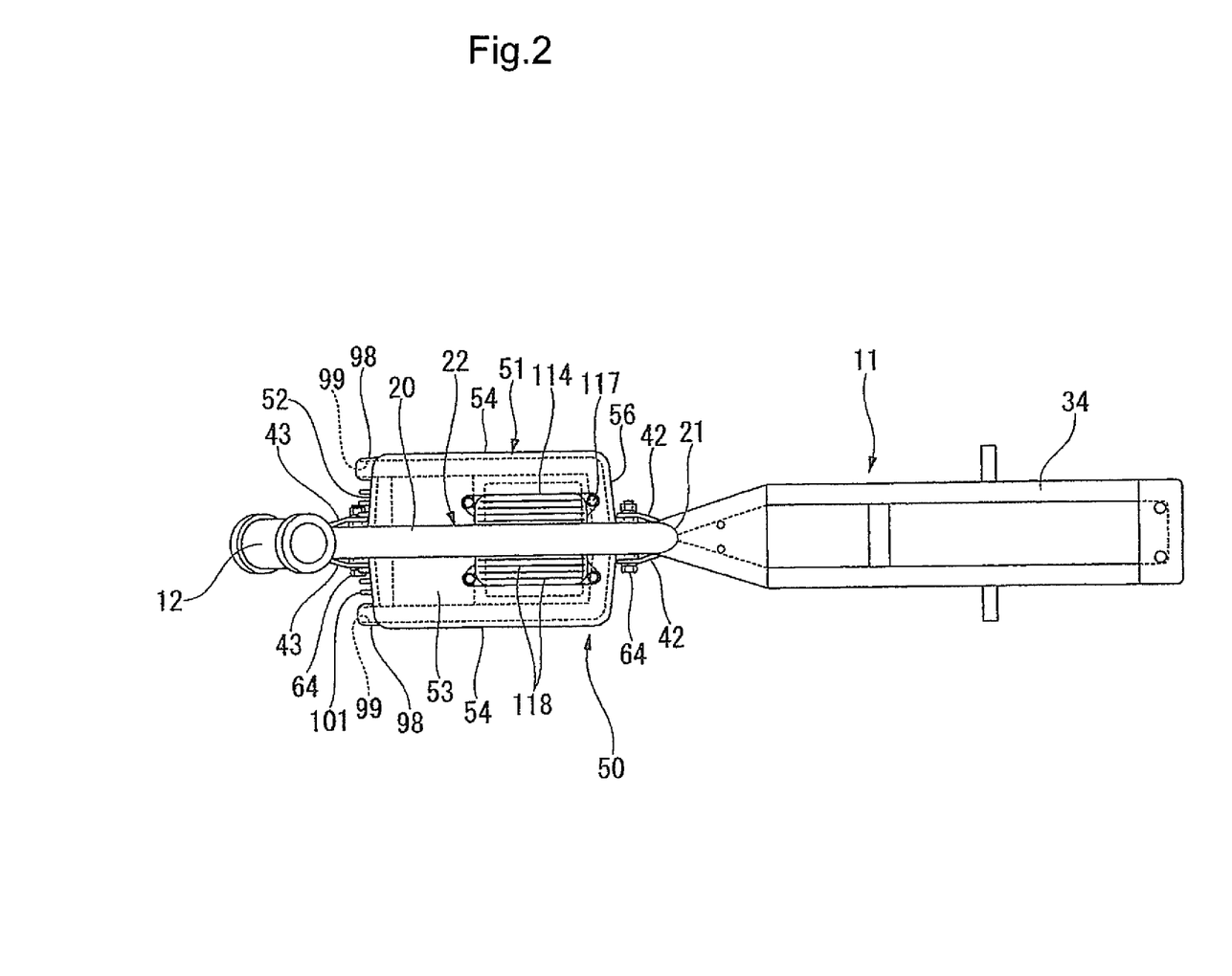
FIG. 2 is a plan view showing a body frame and a drive assembly of the electric motorcycle of FIG. 1.

Furthermore, the body frame 11 includes seat frames 34 which, as shown in FIG. 2, extend rearward respectively from the left and the right upper portions of the back frame portion 21, and then are interconnected at the rear end portion; a pair of left and right rear sub-frames 35 which, as shown in FIG. 1, extend rearward and upward from the left and the right lower portions of the back frame portion 21 and are connected to the left and right of the seat frames 34 respectively; and support plates 36 which are fixed to the connected positions of the sear frames 34 and the rear sub-frames 35 respectively.

A rear shock absorber 37 is interposed between the support plate 36 and the swing arm 30. In addition, a seat 38 and a seat cowl 39 are attached to the seat frame 34.

The back frame portion 21 of the main frame 22 has a pair of left and right installation plates 42 at the upper portion thereof. The front frame portion 24 of the down tube 26 has a pair of left and right installation plates 43 at the middle portion thereof and a pair of left and right installation plates 44 at the lower portion thereof. In addition, the lower frame portion 25 has a pair of left and right installation plates 45 at the rear end portion thereof.

Further, a drive assembly 50 is disposed in the central portion of the body frame 11, surrounded by the main frame 22 and the down tube 26 in such a shape as to be supported by the installation plates and the pivot bracket 28.

A case member 51, providing the exterior appearance of the drive assembly 50, is made of aluminum alloy. The case member 51 is configured in a substantially rectangular parallelepiped box-like shape. The substantially box-shaped case member 51 includes a front plate portion 52 which is substantially perpendicular with respect to the front and rear direction; an upper plate portion 53 which extends rearward along the substantially horizontal direction from the upper end portion of the front plate portion 52; a pair of left and right side plate portion 54 which extend rearward along the substantially vertical direction from the left and right edge portions of the front plate portion 52; a lower plate portion 55 which extends rearward along the substantially horizontal direction from the lower end portion of the front plate portion 52; and a rear plate portion 56 which is provided substantially parallel to the front plate portion 52 so as to connect the rear end portions of the upper plate portion 53, a pair of left and right side plate portions 54 and the lower plate portion 55.

A first installation boss 58 is formed on the front surface of the front plate portion 52 of the case member 51, near an upper front corner thereof. The first installation boss 58 protrudes forwardly at a central part (in the left and right direction) of the upper front portion of the case member 51. A second installation boss portion 59 is formed on the front surface of the front plate portion 52 of the case member 51, near a lower front corner thereof. The second installation boss 59 protrudes forwardly, also at central part in the left and right direction of the lower front portion of the case member 51.

A third installation boss 60 protrudes rearwardly at an upper central portion of the case member 51, on the rear surface of the rear plate portion 56. A fourth installation boss 61 protrudes rearwardly at a lower central portion of the case member 51 on the rear surface of the rear plate portion 56. A fifth installation boss 62 protrudes downwardly on a lower central at the back of the lower plate portion 55 of the case member 51. Each of the first through fifth installation bosses 58, 59, 60, 61 and 62 has a respective through hole formed therein, as shown, to receive a shaft of a fastener.

Furthermore, the drive assembly 50 is installed such that the first installation boss 58 is attached to the installation plate 43 of the front frame portion 24 with a fastening tool 64 such as bolt, nut and the like; the second installation boss 59 is attached to the installation plate 44 of the front frame portion 24 with a similar fastening tool 64; the third installation boss 60 is attached to the installation plate 42 of the rear frame portion 21 with a similar fastening tool 64; the fourth installation boss 61 is attached to the pivot bracket 28 with a similar fastening tool 64, and the fifth installation boss 62 is attached to the installation plate 45 of the lower frame portion 25 with a similar fastening tool 64. In this way, the drive assembly 50 is mounted on the body frame 11.

The drive assembly 50 mounted in this way functions to connect a gap 65 between the pivot bracket 28 and the lower frame portion 25, which are spaced apart from each other in the body frame 11, which causes the drive assembly 50 to effectively provide a part of the body frame 11. Namely, the body frame 11 is formed in a mono-backbone diamond frame having the single main frame 22, and connecting the dividing portion 65 between the pivot bracket 28 fixed to the main frame 22 and the down tube 26 by using the drive assembly 50.

Figure 3:
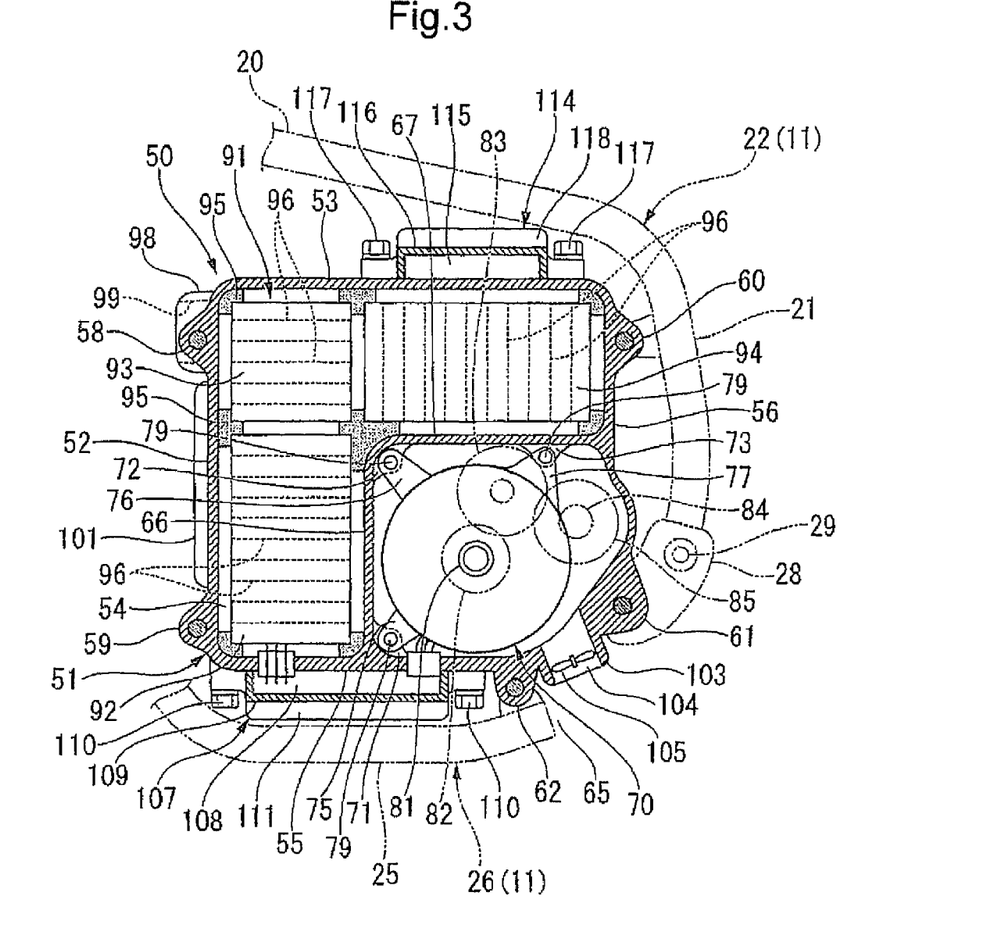
FIG. 3 is a partial side-sectional view showing the body frame and the drive assembly of the electric motorcycle of FIGS. 1-2.

Additionally, within the case member 51, as shown in FIG. 3, the drive assembly 50 has a vertical plate 66 which extends upwardly in parallel with front plate portion 52 from the intermediate position in the front-and-rear direction of the lower plate portion 55; and a horizontal plate 67 which extends substantially horizontally rearwardly from the upper edge portion of the vertical plate portion 66, and is connected to a vertically intermediate part of the rear plate portion 56. The vertical plate portion 66 and the horizontal plate portion 67 are formed in the center position in the left and right direction within the case member 51, and are spaced apart from the left and right side plate portions 54.

An electric motor 70, for generating a traveling driving force, is accommodated within the case member 51 in the space of the rear and lower portion surrounded by the vertical plate portion 66, the horizontal plate portion 67, the rear portion of the lower plate 55 and the lower portion of the rear plate portion 56.

More specifically, an installation boss 71 at the boundary between the rear surface of the vertical plate portion 66 and the upper surface of the lower plate portion 55, an installation boss 72 at the boundary between the rear surface of the vertical plate portion 66 and the lower surface of the horizontal plate portion 67, and an installation boss 73 at the rear portion of the lower surface of the horizontal plate portion 67, respectively, are formed on the case member 51.

In accordance with such structure, a plurality of connecting tabs are formed on the electric motor 70, including a first connecting tab 75 at the lower portion on the front side, a second connecting tab 76 at the upper portion on the front side and a third connecting tab 77 at the upper portion on the rear side, respectively.

Accordingly, the first connecting tab 75 is attached to the installation boss 71 with a fastening tool 79 such as bolt, nut and the like, the second connecting tab 76 is attached to the installation boss 72 with a similar fastening tool 79, and the third connecting tab 77 is attached to the installation boss 73 with a similar fastening tool 79.

The electric motor 70 is accommodated in the case member 51 in such a transverse state as to dispose a rotary shaft 81 extending in the left and right direction. A gear 82 which is fixed to the rotary shaft 81 disposed on the left side is engaged with a reduction gear 83 rotatably provided within the case member 51, and the reduction gear 83 is engaged with a gear 85 of a countershaft 84 also rotatably provided within the case member 51.

The countershaft 84 protrudes to the left side from the case member 51, on which a front sprocket 86 as shown in FIG. 1 is fixed. The driving force of the electric motor 70 is transmitted to the rear wheel 31 through the front sprocket 86, a rear sprocket 87 attached to the rear wheel 31 and a chain 88 spanned therebetween.

As shown in FIG. 3, a battery 91 feeding the electric motor 70 is accommodated in an inverted L-shaped space as seen in side view, surrounded by the front plate portion 52, the upper plate portion 53, the front portion of the lower plate portion 55, the vertical plate 66, the horizontal plate 67 and the upper portion of the rear plate portion 56 within the case member 51.

The battery 91 is configured of three battery modules 92, 93 and 94, each of which is respectively formed in a rectangular parallelepiped shape. The battery module 92 is disposed between the lower portion of the front plate portion 52 and the vertical plate 66. The battery module 93 is disposed above the battery module 92 as well as below a front part of the upper plate portion 53, and the battery module 94 is disposed on the rear side of the battery module 93 as well as between the rear portion of the upper plate portion 53 and the horizontal plate 67.

By such constitution, the battery module 92 is disposed horizontally in front of the electric motor 70, the battery module 94 is disposed vertically above the electric motor 70, and the battery module 93 is disposed vertically above the battery module 92 as well as horizontally in front of the battery module 94.

In other words, the battery module 92 is disposed forward so as to overlap the position in vertical direction with respect to the electric motor 70, the battery module 94 is disposed upward so as to overlap the position in front and rear direction with respect to the electric motor 70, and the battery module 93 is disposed upward so as to overlap the position in front and rear direction with respect to the battery module 92 as well as is disposed frontward so as to overlap the position in vertical direction with respect to the battery module 94.

In addition, the electric motor 70 and the battery modules 92 through 94 all overlap the positions in left and right direction. With such structure, the battery 91 is, as a whole, in such an inverted L-shape in side view that the lower portion on the rear side of the rectangle is notched in a rectangular shape, and the electric motor 70 is disposed in the notched position. Here, it is noted that three battery modules 92 through 94 are supported on the case member 51 so as to form a space from each other as well as between the case member 51 and the battery modules having a support member 95 interposed.

Within the battery modules 92 through 94, a plurality of partitions 96 are formed in parallel and the bar-shaped battery body (not shown) is disposed between each partition. While the extending direction of the partitions 96 for the front-side battery modules 92 and 93 is the front-and-rear direction, the extending direction of the partitions 96 for the rear-side battery module 94 is vertical direction. In the battery modules 92 through 94, a bleeder (not shown) is formed in front of and behind the partitions 96 in the extending direction for causing the air to pass through.

As shown above, the drive assembly 50 is configured by accommodating the electric motor 70 and the battery 91 in the case member 51.

Figure 4:
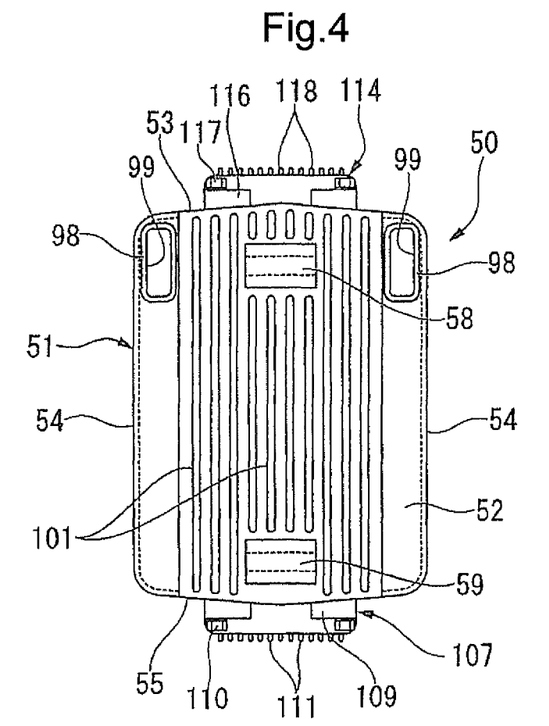
FIG. 4 is a front view showing the drive assembly of the electric motorcycle.

As shown in FIG. 4, air intake ducts 98 are formed on the front side of the front plate portion 52 of the case member 51 so as to protrude horizontally forward respectively on the left and right side of the upper end portion thereof. Inside the air intake ducts 98, intake ports 99 which cause the inside and outside of the case member 51 to be communicated by penetrating the front plate portion 52 of the case member 51 are formed along the protruding direction of the air intake ducts 98. Namely, the intake ports 99 for taking in air are provided at the upper portion on the front side of the case member 51.

Here, the positions in the left and right direction of the intake ports 99 are decided with respect to the space formed between a pair of left and right side plate portions 54 described above and the vertical plate 66, and the horizontal plate 67 which are provided in the center. Further, on the front side of the case member 51, a plurality of fins 101 (also referred as first fins) protruding forward and extending vertically are formed in the left and right direction in the range except the air intake ducts 98, the lower side thereof, the above-mentioned installation boss portions 58, 59 in the upper and lower portions.

Figure 5:
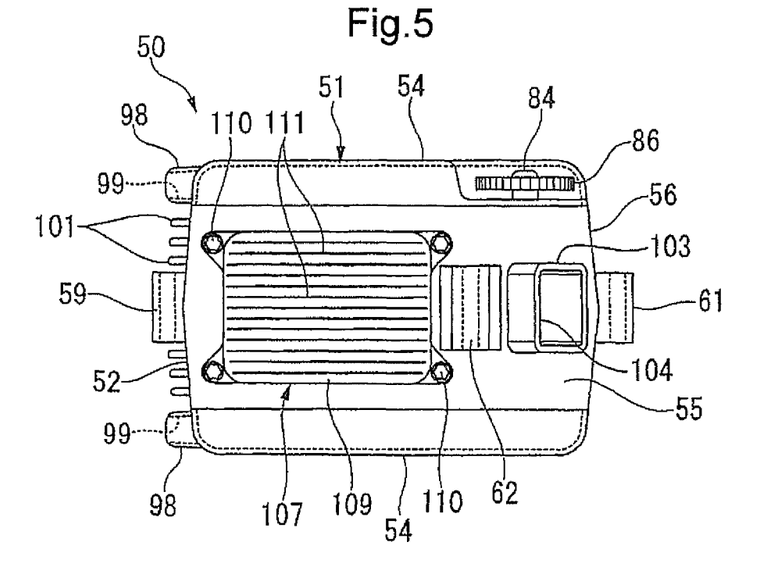
FIG. 5 is a bottom view showing the drive assembly of the electric motorcycle.

In addition, as shown in FIG. 5, at the center position in the left and right direction on further rear side than the installation boss portion 62 on the lower surface of the lower plate portion 55 of the case member 51, there is formed an air exhaust duct 103 so as to protrude obliquely rearward and downward as shown in FIG. 3.

An exhaust port 104 is formed inside the air exhaust duct 103 along the protruding direction of the air exhaust duct 103, for communicating the inside and outside of the case member 51 by penetrating the lower plate portion 55 of the case member 51. In the exhaust port 104, the electric fan 105 which forcibly discharge the air in the case member 51 is disposed. Namely, the exhaust port 104 for discharging the air is provided on the lower portion on the rear side of the case member 51.

Here, during traveling of the motorcycle M, the traveling wind enters the case member 51 from the intake ports 99, flows rearward and downward toward the exhaust port 104, is discharged from the exhaust port 104 to cool down the electric motor 70 and the battery 91. Moreover, during the stop of the motorcycle M, air within the case member 51 is forcibly discharged from the exhaust port 104 by driving an electric fan 105. As a result, air enters the case member 51 from the intake ports 99, flows in the same manner as the aforementioned to cool down the electric motor 70 and the battery 91.

The drive assembly 50 is mounted further frontward than the installation boss portion 62 on the lower surface of the lower plate portion 55 of the case member 51, and includes a motor driver (PDU: power driver unit) 107.

The motor driver 107 includes a motor driver body 108 which is a high pressure electric equipment and a lower portion cover 109 which is made of aluminum alloy covering the front, rear, left, right and lower side of the motor driver body 108, and the lower portion cover 109 accommodating the motor driver body 108 is mounted on the lower surface of the case member 51 with fastening tools 110 such as bolts. As shown in FIG. 5, a plurality of fins 111 (also referred as second fins) protruding downward and extending longitudinally are formed in parallel in the left and right direction on the lower surface of the lower cover 109 of the motor driver 107.

As shown in FIG. 3, the motor driver 107 is disposed vertically below the electric motor 70 as well as the battery modules 92 and 93 on the front side of the battery 91 within the case member 51 in such a state as to be mounted on the case member 51. That is, the motor driver 107 is disposed therebelow so as to overlap the positions thereof in the front and rear direction and in the left and right direction with regard to the electric motor 70 and with the battery modules 92, 93 on the front side of the battery 91 in such a state to be mounted on the case member 51. The lower frame portion 25 of the body frame 11 is disposed vertically below the motor driver 107 so as to extend longitudinally over the entire length of the motor driver 107.

The drive assembly 50 has a DC-DC converter 114 on the upper surface of the upper plate portion 53 of the case member 51. The DC-DC converter 114 comprises a DC-DC converter body 115 which is a high pressure electric equipment and an upper portion cover 116 which is made of aluminum alloy covering the front, rear, left, right and upper side of the DC-DC converter body 115, and the upper portion cover 116 accommodating the DC-DC converter body 115 is attached to the upper surface of the case member 51 with a fastening tools 117 such as bolts.

As shown in FIG. 2, a plurality of fins 118 protruding upward and extending longitudinally are formed in parallel in the left and right direction On the upper surface of the upper portion cover 116 of the DC-DC converter 114.

The DC-DC converter 114 is disposed vertically above the electric motor 70 as well as the battery module 94 on the rear side of battery 91 within the case member 51, in such a state to be mounted on the case member 51. That is, the DC-DC converter 114 is disposed thereabove so as to overlap the positions thereof in the front and rear direction and in the left and right direction with regard to the electric motor 70 and the battery module 94 on the rear side of and the battery 91 within the case member 51 in such a state to be mounted on the case member 51.

As shown in FIG. 1, within the tank type cover 32, there are disposed a battery charger 121, an electrical outlet cord 122 for electrically wiring the battery charger 121 to off-board electricity such as commercial power supplies, a motor control unit 123 (MCU) which is a high pressure electric equipment and a battery managing unit 124 (BMU) which is a high pressure electric equipment. The tank type cover 32 is provided with a cover portion 125 which can be opened and closed upward, so that the electrical outlet cord 122 can be pulled out by opening the cover portion 125. Additionally, in the space between the back frame portion 21 of the main frame 22, the seat frame 34 and the rear sub-frame 35, there is disposed a subbattery 127.

Figure 6:
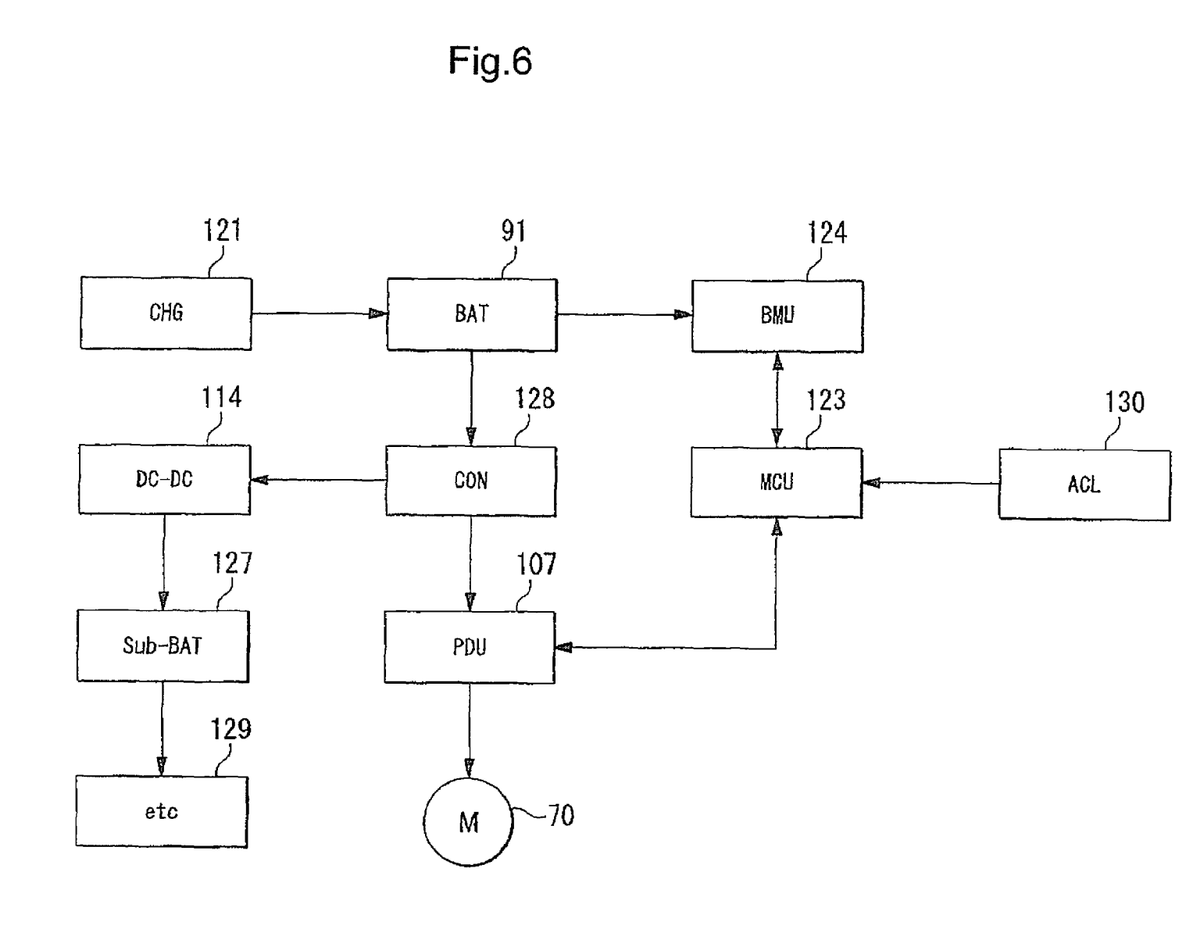
FIG. 6 is a block diagram of a control system of the electric motorcycle.

Here, as shown in FIG. 6, the output voltage from the battery 91 is supplied to the motor driver 107 via an electromagnetic contactor 128 which is in interlocking relationship with a main switch (not shown), and is supplied to the electric motor 70 which is a 3-phase alternating current motor after the output voltage is converted from the direct count to 3-phase alternating current at the motor driver 107. Additionally, the output voltage from the battery 91 is stepped down via the DC-DC converter 114, the low-voltage subbattery 127 of 12V, general electric equipment 129 such as lights and the electric fan 105, and control system equipment such as the motor control unit 123.

The battery 91 is charged by the battery charger 121 connected to, for example, a power source of AC 100V. The discharge and charge status, temperature and the like of the battery 91 is monitored by the battery managing unit 124, and then the information is shared with the motor control unit 123. The output request information from a throttle (accelerator) sensor 130 is input in the motor control unit 123, and based on the output request information, the motor control unit 123 drivingly control the electric motor 70 via the motor driver 107.

According to the electric motorcycle M of the above-described embodiment of the present invention, the battery 91 is disposed to the forward and upward of the electric motor 70, it is possible to put together and compactly dispose the relatively heavy electric motor 70 and the battery 91, which enables to centralize the mass in the vehicle body. In addition, the drive assembly 50 houses the electric motor 70 and the battery 91 in the case member 51, which thereby can improve the installation work and protect the electric motor 70 and the battery 91 effectively.

Additionally, since the drive assembly 50 is provided with the motor driver 107 below the electric motor 70 and the battery 91, it is possible to further centralize the mass in the vehicle body and to further improve the installation work.

Moreover, the motor driver 107 is mounted on the lower surface of the case member 51, which thereby enables to remove and install readily and highly facilitate the maintenance of the motor driver 107.

Further, due to the fact that the lower frame portion 25 of the body frame 11 extends longitudinally on the lower side of the motor driver 107, it is possible to protect the motor driver 107 from hitting the ground.

Furthermore, due to the fact that the front surface of the case member 51 is formed the fins 101 extending vertically, it is possible to flow the driving wind colliding with the front surface of the case member 51 toward the motor driver 107 mounted on the lower surface of the case member 51, which thereby enables to cool the motor driver 107 efficiently.

Besides, due to the fact that the lower surface of the motor driver 107 the fins 111 extending longitudinally, it is possible to flow the driving wind from the front to the rear of the motor driver 107, which thereby enables to cool the motor driver 107 efficiently.

Additionally, due to the fact that air is taken in from the intake ports 99 which are formed to the upper portion on front side of the case member 51, is flown rearward and downward within the case member 51 and is discharged from the exhaust port 104 which is formed to the lower portion on rear side of the case member 51. Thus, it is possible to cool the electric motor 70 and the battery 91 in the case member 51 efficiently.

Since the case member 51 is made of aluminum alloy and joints the intermittent portion 65 of the body frame 11, the case member 51 serves also as a part of the body frame 11, which thereby enables to reduce the vehicle body in weight.

Further, by discharging air from the exhaust port 104 due to the traveling of the electric motorcycle M and the driving of the electric fan 105, the air introduced from the intake ports 99 into the case member 51 flows along the partitions 96 while passing through each of the battery modules 92 through 94.

Here, since the extending direction of the partitions 96 for the front- as well as lower-side battery module 92 and the front- as well as upper-side battery module 93 is the front- and-rear direction, air flows from the front to the rear. Meanwhile, since the extending direction of the partitions 96 for the rear- as well as upper-side battery module 94 is the vertical direction, air flows toward the electric motor 70 in the lower portion. Accordingly, it is possible to cool three battery modules 92 through 94 and the electric motor 70 efficiently.

Figure 7:
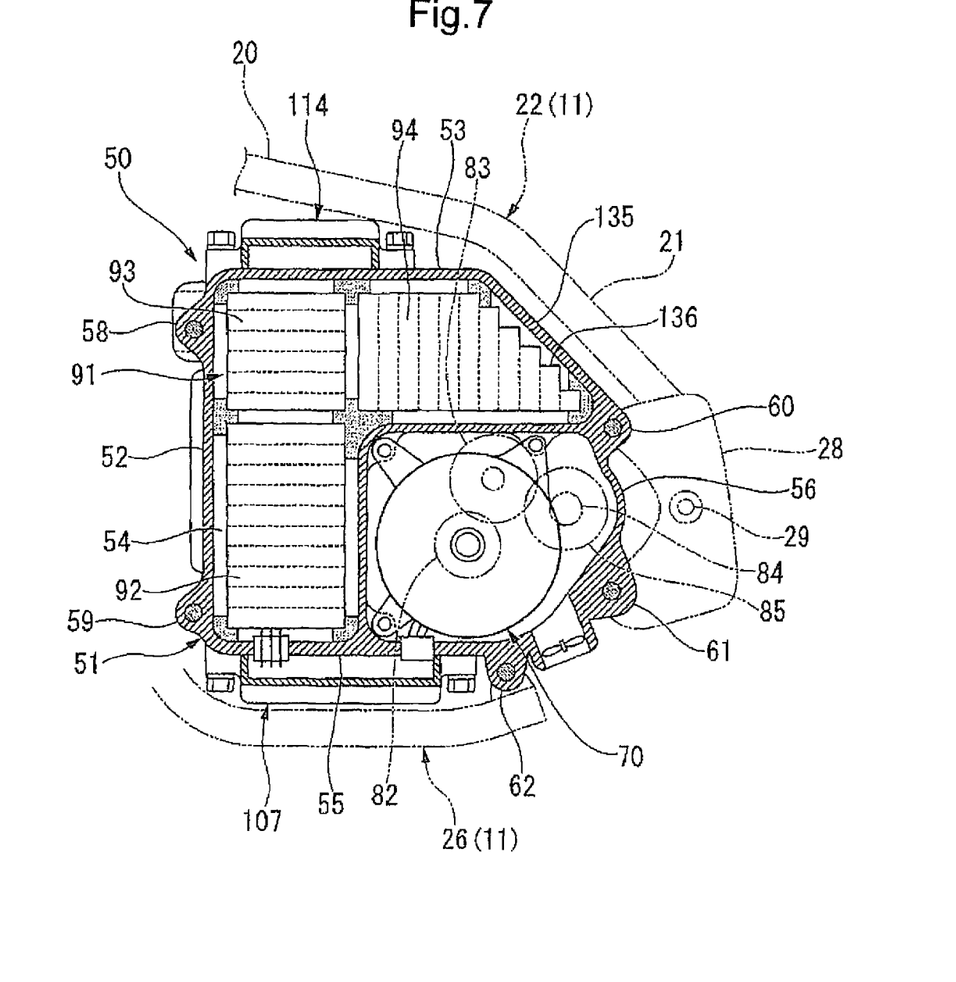
FIG. 7 is a partial side-sectional view showing a modified embodiment of the body frame and drive assembly of the electric motorcycle.

Here, as shown in FIG. 7, in case that the upper frame portion 20 of the main frame 22 is lowered in position and the back frame portion 21 is gently inclined downwardly toward the rear, in order to avoid the interference, it is possible to dispose the DC-DC converter 114 on the front side of the upper plate portion 53, to form an inclined plate portion 135, which is inclined downwardly, at the rear portion as well as at the upper portion of the case member 51 for the drive assembly 50, besides, and to lower the position of the installation boss portion 60 to connect the pivot bracket 28.

Here, in conjunction with that, a notch portion 136, which is inclined downwardly toward the rear, is formed at the rear portion as well as the upper portion of the battery module 94. By such constitution, though the capacity of the battery module 94 is decreased, it is possible to mount the drive assembly 50 on the electric motorcycle M with the body frame 11 in which the position of the upper frame portion 20 is lowered and the back frame portion 21 is inclined downwardly toward the rear.

In addition, it is also possible to support the left and right of the rear portion of the drive assembly 50 with two main frames 22 by extending the main frames 22 from two positions on left and right of the head pipe 12, or to support the left and right of the front portion as well as the left and right of the lower portion of the drive assembly 50 with two down tubes 26 by extending the down tubes 26 from two positions on left and right of the head pipe 12, or to support the drive assembly 50 with two main frames 22 and two down tubes 26 by combining the above-mentioned methods.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A drive assembly for an electric motorcycle comprising:
 an electric motor for generating a traveling driving force;
 a battery for supplying electricity to said electric motor, wherein said battery includes components which are disposed at positions forward and above said electric motor; and
 a case member for accommodating said electric motor and said battery therein; said case member having at least one intake port formed therein at an upper portion on a front side of said case member for taking air into the case member, and an exhaust port formed at a lower portion of a rear side of said case member for discharging air therefrom.

2. The drive assembly for an electric motorcycle according to claim 1, wherein said drive assembly further comprises a motor driver mounted on a lower surface of said case member below said electric motor and said battery.

3. An electric motorcycle including the drive assembly of claim 2 and a body frame including a protective frame section extending longitudinally below said motor driver.

4. The drive assembly for an electric motorcycle according to claim 2, further comprising a plurality of first fins formed on a front surface of said case member, wherein said first fins extend substantially vertically.

5. The drive assembly for an electric motorcycle according to claim 3, further comprising a plurality of first fins formed on a front surface of said case member, wherein said first fins extend substantially vertically.

6. A drive assembly for an electric motorcycle comprising:
an electric motor for generating a traveling driving force;
a battery for supplying electricity to said electric motor, wherein said battery includes components which are disposed at positions forward and above said electric motor;
a case member for accommodating said electric motor and said battery therein;
a motor driver mounted on a lower surface of said case member below said electric motor and said battery;
a plurality of first fins formed on a front surface of said case member, wherein said first fins extend substantially vertically; and
a plurality of second fins formed on a lower surface of said motor driver, wherein said second fins extend longitudinally.

7. An electric motorcycle including the drive assembly of claim 6 and a body frame including a protective frame section extending longitudinally below said motor driver.

8. The drive assembly for an electric motorcycle according to claim 2, further comprising a plurality of second fins formed on a lower surface of said motor driver, wherein said second fins extend longitudinally.

9. An electric motorcycle comprising the drive assembly of claim 1 and a body frame having a dividing portion, wherein said case member is made of aluminum alloy and is attached to said dividing portion of said body frame.

10. An electric motorcycle comprising the drive assembly of claim 2 and a body frame having a dividing portion, wherein said case member is made of aluminum alloy and is attached to said dividing portion of said body frame.

11. An electric motorcycle comprising the drive assembly of claim 3 and a body frame having a dividing portion, wherein said case member is made of aluminum alloy and is attached to said dividing portion of said body frame.

12. A electric motorcycle comprising:
a body frame having a plurality of frame members;
a case member secured to said body frame;
an electric motor for generating a traveling driving force;
a battery for supplying electricity to said electric motor; said battery comprising a plurality of battery modules; and
a motor driver arranged below said electric motor and said battery;
wherein:
said case member is configured to receive said electric motor and said battery modules therein;
each of said battery modules is disposed at one of a position forward and upward of said electric motor; and
said motor driver is mounted on a lower surface of said case member.

13. An electric motorcycle according to claim 12, wherein said frame members comprise a protective frame extending longitudinally on a lower side of said motor driver.

14. An electric motorcycle comprising:
a body frame comprising a plurality of frame members;
a drive assembly disposed in said body frame; and
a case member having an electric motor and a battery accommodated therein;
wherein said battery comprises a plurality of battery modules, each of said battery modules disposed forwardly or above said electric motor; and
wherein said case member, said electric motor and said battery modules are protected by said frame members of said body frame.

15. An arrangement of an electric motor and a battery according to claim 14, further comprising a motor driver mounted on a lower surface of said case member;
wherein said case member comprises a plurality of plate members surrounding said electric motor and said battery, wherein at least one of said plate members is arranged above a portion of one of said battery modules in an inclined configuration with respect to longitudinal and vertical axes of said body frame.

* * * * *